United States Patent
Han et al.

(10) Patent No.: US 10,124,689 B2
(45) Date of Patent: Nov. 13, 2018

(54) METHOD AND APPARATUS FOR CHARGING ELECTRIC VEHICLE USING ALTERNATING CURRENT (AC) CHARGER

(71) Applicant: Hyundai Motor Company, Seoul (KR)

(72) Inventors: Ja Chun Han, Gyeonggi-do (KR); Ho Joong Lee, Gyeonggi-do (KR); In Seok Park, Seoul (KR); Seung Jae Yoo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 24 days.

(21) Appl. No.: 15/365,489

(22) Filed: Nov. 30, 2016

(65) Prior Publication Data
US 2018/0072171 A1    Mar. 15, 2018

(30) Foreign Application Priority Data
Sep. 12, 2016  (KR) .......................... 10-2016-0117043

(51) Int. Cl.
*H02J 7/00*  (2006.01)
*B60L 11/18*  (2006.01)

(52) U.S. Cl.
CPC ....... *B60L 11/1825* (2013.01); *B60L 11/1816* (2013.01); *B60L 2230/16* (2013.01)

(58) Field of Classification Search
CPC .............. B60L 11/1825; B60L 11/1816; B60L 2230/16
See application file for complete search history.

(56) References Cited

U.S. PATENT DOCUMENTS

| 2013/0179061 A1* | 7/2013 | Gadh | B60L 11/1842 |
| | | | 701/123 |
| 2013/0314034 A1* | 11/2013 | Ang | B60W 20/00 |
| | | | 320/107 |
| 2017/0050527 A1* | 2/2017 | Tsuchiya | B60L 11/1816 |
| 2017/0101022 A1* | 4/2017 | Morgan | B60L 11/1838 |

FOREIGN PATENT DOCUMENTS

| KR | 10-1519780 B1 | 5/2015 |
| KR | 10-2016-0027719 A | 3/2016 |
| KR | 10-2016-0057524 A | 5/2016 |

\* cited by examiner

*Primary Examiner* — Nha Nguyen
(74) *Attorney, Agent, or Firm* — Mintz Levin Cohn Ferris Glovsky and Popeo, P.C.; Peter F. Corless

(57) ABSTRACT

A vehicle charging control method is provided. The method includes recognizing scheduled charging information predetermined for vehicle charging and detecting charging equipment connected to the vehicle. Whether a scheduled charging is performed is determined based at least on whether charging information from the charging equipment corresponds to the scheduled charging information. Whether an automatic charging is performed is determined based at least on predetermined user set-up information when the charging information deviates from the scheduled charging information. A charging operation, including the scheduled charging and the automatic charging is then performed for the vehicle.

20 Claims, 10 Drawing Sheets

|  | | SCHEDULED CHARGING IS ESTABLISHED | SCHEDULED CHARGING IS NOT ESTABLISHED |
|---|---|---|---|
| PORTABLE CHARGER (ICCB) | SELECTION | PERFORM SCHEDULED CHARGING ACCORDING TO SCHEDULED CHARGING ESTABLISHED IN EVSE CONNECTION | IMMEDIATE CHARGING |
|  | NON-SELECTION | PERFORM IMMEDIATE CHARGING DURING ICCB CONNECTION | |
| PUBLIC-USE CHARGER (EVSE) | SELECTION | PERFORM SCHEDULED CHARGING ACCORDING TO SCHEDULED CHARGING ESTABLISHED IN EVSE CONNECTION | |
|  | NON-SELECTION | PERFORM IMMEDIATE CHARGING DURING EVSE CONNECTION | |

FIG. 8A

|  | SCHEDULED CHARGING IS ESTABLISHED | SCHEDULED CHARGING IS NOT ESTABLISHED |
|---|---|---|
| PORTABLE CHARGER (ICCB) | PERFORM SCHEDULED CHARGING ACCORDING TO SCHEDULED CHARGING ESTABLISHED IN EVSE CONNECTION | IMMEDIATE CHARGING |
| PUBLIC-USE CHARGER (EVSE) | PERFORM IMMEDIATE CHARGING DURING EVSE CONNECTION | |

FIG. 8B

METHOD AND APPARATUS FOR CHARGING ELECTRIC VEHICLE USING ALTERNATING CURRENT (AC) CHARGER

CROSS REFERENCE TO RELATED APPLICATION(S)

This application claims priority to and the benefit of Korean Patent Application No. 10-2016-0117043, filed on Sep. 12, 2016 in the Korean Intellectual Property Office, the disclosure of which is hereby incorporated by reference in its entirety as if fully set forth herein.

BACKGROUND

Field of the Disclosure

The present disclosure relates to a method and apparatus for charging an electric vehicle using alternating current (AC) charging equipment, and more particularly to a method and apparatus for automatically charging an in-vehicle battery by detecting a connection state of the AC charging equipment based on user setting information.

Discussion of the Related Art

Hybrid vehicles or electric vehicles are well known as eco-friendly vehicles to those skilled in the art. The hybrid vehicle is defined as a vehicle having at least two power sources such as an engine and motor, and the electric vehicle is defined as a vehicle equipped with a plug-in battery. The hybrid vehicle may self-charge the battery by operating a generator while the vehicle is being driven, and may convert the charged electricity into vehicle driving energy. Specifically, the hybrid vehicle converts kinetic energy of the electric motor configured to rotate in a reverse direction during vehicle deceleration into electric energy using a regenerative braking system, stores the electric energy in the battery, and uses the stored energy during vehicle traveling, resulting in increased energy efficiency.

The electric vehicle has been designed to be used after having been charged similar to electronic products. The charging system for charging the battery of the electric vehicle may be implemented in various ways. As a representative example of the charging system mounted to the vehicle, an on board charger (OBC) configured to convert AC power into direct current (DC) power to charge the battery may be used. Since the OBC is mounted to the vehicle, it is necessary to operate the OBC via communication with the other in-vehicle control unit (VCU), reliability guarantee in vehicle constituent elements and power density improvement through implementation of small-sized and lightweight products may be used as the principal design elements.

When the battery of the vehicle equipped with the electric charging system is charged using the AC charging system, the method for efficiently managing the charging time may increase convenience of the electric vehicle due to a relatively long charging time (e.g., at least 4 hours used as a reference time of the electric vehicle equipped with a 28 kWh battery), and also the charging costs (e.g., difference between midnight electric rates and daytime electric rates) differently assessed to users according to lapse of time.

To increase user convenience, the vehicle and AC charging system are capable of providing a scheduled charging operation. The scheduled charging operation may facilitate execution of the charging process at a time established for scheduled charging under the condition that the vehicle is connected to the AC charging system. Meanwhile, when the scheduled charging operation is not used, the user engages a start button to perform the charging process after connecting the vehicle to the AC charging system, resulting in execution of the charging process.

SUMMARY

The disclosed disclosure provides a method and apparatus for charging an electric vehicle using alternating-current (AC) charging equipment which substantially obviates one or more problems due to limitations and disadvantages of the related art. An object of the present disclosure is to provide an apparatus and method for charging an in-vehicle battery based on user setting information when an in-vehicle control device recognizes the AC charging equipment.

Another object of the present disclosure is to provide a method and apparatus for recognizing the category of the AC charging equipment to determine whether immediate charging will be performed when the AC charging equipment connected to the vehicle is detected, determining execution or non-execution of the charging process in response to the user setup electric rates and the charge scheduled time, and automatically performing charging.

Yet another object of the present disclosure is to provide, when the AC charging equipment is connected to the vehicle, a method and apparatus for providing a connection state to any one of a user-desired wireless terminal, an in-vehicle multimedia device, etc., and charging the in-vehicle battery based on a user input command received through a user interface (UI).

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a vehicle charging control method may include: recognizing scheduled charging information predetermined for vehicle charging; detecting a charging equipment connected to the vehicle; determining execution or non-execution of a scheduled charging operation based on whether charging information related to the charging equipment corresponds to the scheduled charging information; when the charging information deviates from the scheduled charging information, determining execution or non-execution of an automatic charging operation according to predetermined user set-up information; and performing the charging operation according to execution or non-execution of the scheduled charging operation or execution or non-execution of the automatic charging operation.

The user set-up information may include a type of the charging equipment for charging, an operation time of the user, and accounting information to be consumed for the charging. In association with execution or non-execution of the automatic charging operation, when the charging equipment is public-use stationary charging equipment based on the charging information, and when the vehicle detects the charging equipment, the charging may be immediately performed.

In association with execution or non-execution of the automatic charging operation, when the charging equipment is a public-use portable charging equipment based on the charging information, and when the vehicle detects the charging equipment, the charging may be immediately performed, or the charging may be performed based on the scheduled charging operation contained in the user set-up information. In association with execution or non-execution of the automatic charging operation, when the charging equipment is private-use charging equipment based on the charging information, and when the vehicle detects the charging equipment, the charging operation may be deferred until the charging information corresponds to the set-up information.

In association with execution or non-execution of the automatic charging operation, the charging may be immediately performed in response to a user input signal. The charging equipment may be an alternating current (AC) charging equipment configured to provide AC power or AC electricity, and may support at least one of two AC power sources comprised of a first level (Level 1) based on a 120V AC power plug and a second level (Level 2) based on a 240V or 208V AC power plug.

The charging equipment may be used as public-use or private-use charging equipment, and may correspond to at least one of stationary charging equipment permanently connected to a power supply unit and a portable charging equipment including an in-cable-control box (ICCB). The detecting the charging equipment connected to the vehicle may include: recognizing a connection state of the charging equipment; recognizing the charging equipment; and selecting any one of a high-speed charging mode and a low-speed charging mode in response to the charging equipment.

The vehicle charging control method may further include: performing the charging in the high-speed charging mode, irrespective of execution or non-execution of the scheduled charging or execution or non-execution of the automatic charging. The charging information may include specific information indicating whether the charging equipment is a stationary charging equipment or a portable charging equipment including an in-cable-control box (ICCB) based on a control pilot (CP) signal duty ratio (or duty cycle).

The vehicle charging control method may further include: transmitting status data regarding the charging process to a user-desired terminal according to execution or non-execution of the scheduled charging operation or execution or non-execution of the automatic charging operation. A computer-readable recording medium according to another exemplary embodiment is executed through a processor, and an application program for implementing a method for controlling a plurality of in-vehicle chargers may be written in the computer-readable recording medium.

In accordance with another aspect of the present disclosure, a vehicle charging control apparatus may include: a storage unit (e.g., a memory) configured to store predetermined scheduled charging information and user set-up information therein; a charger configured to receive supply power from a charging equipment; a vehicle control unit (VCU) (e.g., a controller) configured to determine execution or non-execution of a scheduled charging operation based on whether charging equipment related charging information received from the charger corresponds to the scheduled charging information, and when the charging information deviates from the scheduled charging information, and configured to determine execution or non-execution of an automatic charging operation based on the user set-up information; and a battery manager configured to recognize a battery state based on specific information determined by the vehicle controller, and request the charger to perform execution of the charging, wherein the specific information indicates execution or non-execution of the scheduled charging operation and execution or non-execution of the automatic charging operation.

The user set-up information may include a type of the charging equipment for charging of the battery, an operation time of the user, and accounting information to be consumed for the charging. In association with execution or non-execution of the automatic charging operation, when the charging equipment is public-use stationary charging equipment based on the charging information, and when the vehicle detects the charging equipment, the charging may be immediately performed.

In association with execution or non-execution of the automatic charging operation, when the charging equipment is public-use portable charging equipment according to the charging information, and when the vehicle detects the charging equipment, the charging may be immediately performed, or the charging may be performed according to the scheduled charging operation contained in the user set-up information. In association with execution or non-execution of the automatic charging operation, when the charging equipment is private-use charging equipment according to the charging information, and when the vehicle detects the charging equipment, the charging operation may be deferred until the charging information corresponds to the set-up information.

In association with execution or non-execution of the automatic charging operation, the charging may be immediately performed in response to a user input signal. When the charging equipment is an alternating current (AC) charging equipment for providing AC power or AC electricity, the charger may be configured to receive at least one of two AC power sources comprised of a first level (Level 1) based on a 120V AC power plug and a second level (Level 2) based on a 240V or 208V AC power plug. When the charger confirms a connection state of the charging equipment and recognizes the charging equipment, the vehicle controller may be configured to select any one of a high-speed charging mode and a low-speed charging mode in response to the charging equipment.

The vehicle controller may be configured to perform the charging in the high-speed charging mode, irrespective of execution or non-execution of the scheduled charging or execution or non-execution of the automatic charging. The charging information may include a control pilot (CP) signal duty ratio (or duty cycle) indicating whether the charging equipment is a stationary charging equipment or a portable charging equipment including an in-cable-control box (ICCB).

The charger may be configured to recognize a type of the charging equipment based on a control pilot (CP) signal duty ratio (or duty cycle). The vehicle charging control apparatus may further include: a communicator configured to transmit status data of the charging process to a user-desired terminal according to execution or non-execution of the scheduled charging operation or execution or non-execution of the automatic charging operation. The scheduled charging information and the user set-up information may be received via at least one of an in-vehicle multimedia system (i.e., Audio Video Navigation (AVN) device) and a telematics server or wireless terminal connected over a network.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate exemplary embodiment(s) of the disclosure and together with the description serve to explain the principle of the disclosure. In the drawings:

FIGS. 8A-8B are diagrams illustrating a vehicle charging control method capable of being selected by the user according to an exemplary embodiment of the present disclosure;

DETAILED DESCRIPTION

Figure 1:
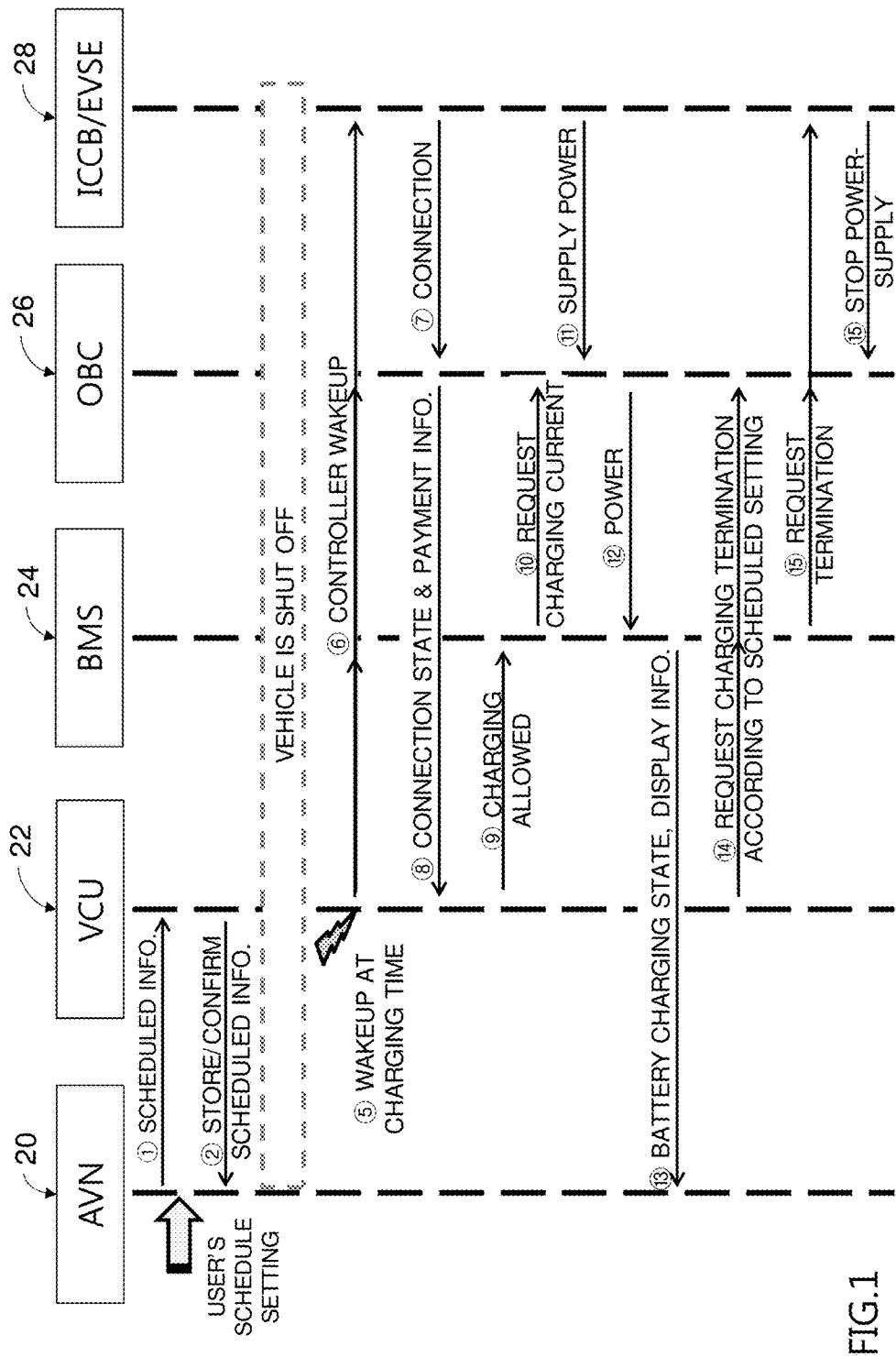
FIG. 1 is a flowchart illustrating a vehicle charging control method using a scheduled charging operation according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an apparatus and method according to exemplary embodiments of the present disclosure will be described with reference to the accompanying drawings. In the following description, suffixes "module" and "unit" contained in terms of constituent elements to be described will be selected or used together in consideration only of the convenience of writing the following specification, and the suffixes "module" and "unit" do not necessarily have distinct meanings or roles.

In the following description, assuming that a certain object is formed above (over) or below (beneath) the respective constituent elements, this means that two constituent elements are brought into direct contact with each other, one or more constituent elements are disposed and formed between two constituent elements. In addition, assuming that a certain object is formed over or below the respective constituent elements, this means that the object may also be arranged in upward or downward directions based on the position of one constituent element.

With the increasing number of eco-friendly vehicles (e.g., hybrid vehicles, electric vehicles, etc.) configured to receive energy required for vehicle driving through the battery, or with increasing performance of vehicle driving, energy storage capacity (e.g., battery storage capacity) of the battery required for the eco-friendly vehicle will rapidly increase. When storage capacity of the battery contained in the vehicle increases, the battery charging time may also increase. As a result, vehicle mobility may deteriorate, such that the method and apparatus for efficiently and rapidly charging a high-capacity battery based on the user's usage pattern are required. However, the apparatus for rapidly charging the high-storage battery may encounter high costs to construct the on board charger (OBC) and the infrastructure for supplying the vehicle with power. Therefore, the on board charger (OBC) in which the charger is directly mounted to the vehicle is used to charge the in-vehicle battery used as a general household power supply unit with electricity.

For example, the OBC may be mounted to the vehicle, such that high power density and low noise are required. For this purpose, the switching frequency needs to be increased. In addition, the switching frequency is associated with overall energy efficiency of the vehicle, such that a high-efficiency OBC is needed. To implement compatibility between the OBC and the charging infrastructure, it is necessary for the OBC to have a universal input voltage (e.g., 100 to 240 Vac) and wide battery voltage (e.g., 220 to 420 Vdc). Recently, as OBC capacity rapidly increases, the battery charger platform increases in level from 3.3 kW battery to 6.6 kW battery. In addition, the platform capacity for reducing the OBC charging time will rapidly increase in the future.

The apparatus for charging the vehicle may be broadly classified into a low-speed charger for providing AC power and a high-speed charger for providing DC power. In particular, the high-speed charger may be installed at a location that experiences heavy-traffic or a public charging station. For example, the high-speed charger may move at about 60~80 miles per hour for about 20 minutes, and thus, the high-speed charger may charge the OBC to allow the vehicle to move at about 60~80 miles per hour for a charging time of about 20 minutes. In contrast, the low-speed charger is configured to supply AC power. When the vehicle is charged with electricity for about 1 hour, the OBC may be charged for a predetermined time during which the vehicle may move at about 2-5 miles or about 10-20 miles.

The charging equipment (i.e., AC charging equipment) configured to provide AC power has relatively lower installation costs compared to the DC charging equipment configured to provide DC power, and thus, the AC charging equipment may be installed in a house, apartment building, or the like. In contrast, when the vehicle is charged with electricity using the AC charging equipment, a charging time of about 4-6 hours may be consumed, and thus, the operation for efficiently performing the charging operation is of importance. Accordingly, the scheduled charging operation may be provided to charge the vehicle with electricity when the vehicle driver or user does not drive the vehicle.

For example, assuming that the user who uses the scheduled charging operation decides to charge the vehicle with electricity during a predetermined time from midnight to 6:00 AM, when the vehicle driver or user parks the vehicle in the parking lot before the midnight and connects the vehicle to the charging equipment, the vehicle may be configured to autonomously interact with the charging equipment from midnight after staying in the standby mode until midnight and thus, the in-vehicle battery may be charged with electricity. When the user connects the charging equipment to the vehicle for a predetermined time determined by the scheduled charging operation, the vehicle may be immediately charged with electricity without a standby time.

As described above, a user convenience function (hereinafter referred to as the scheduled charging operation) for charging the battery at a user desired time is provided to the vehicle including the in-vehicle battery charger, and the user convenience function may be limited to when the vehicle is connected to the AC charging equipment. In other words, the charging start time may be determined based on the charge execution time reserved by the user, and the control system associated with the charging operation may initiate at the corresponding time, and perform battery charging. When the battery is charged with electricity that corresponds to the target storage capacity desired by the user, battery charging may be stopped. In contrast, when the vehicle is connected to the high-speed charger configured to provide DC power, the charging time may be minimal and thus, the battery charging operation may begin after the vehicle is connected to the charger and costs for such charging are paid, irrespective of setting or non-setting of the scheduled charging operation.

FIG. 1 is a flowchart illustrating a vehicle charging control method using a scheduled charging operation. Referring to FIG. 1, the scheduled charging operation may be input by a user to the user interface (UI) of the in-vehicle multimedia system (e.g., Audio Video Navigation (AVN) device). A multimedia system 20 may be configured to store user-desired scheduled charging information (e.g., the input) therein, and transmit the scheduled charging information to a vehicle control unit (VCU) 22 (e.g., a controller). The vehicle controller 22 may be configured to determine whether the scheduled charging information is stored in the multimedia system 20.

The above-mentioned process for allowing the user to establish the scheduled charging information using the multimedia system 20, or for allowing the vehicle controller 22 to detect the stored scheduled charging information in the multimedia system 20 may be outperformed when the vehicle starts or when the in-vehicle electronic units of the vehicle are switched on.

After the vehicle is parked in the parking lot, the vehicle stops operation, and the vehicle may be connected to the charger. When the scheduled charging information confirmed before the in-vehicle electronic units are turned off is present, the vehicle controller 22 may awake (e.g., initiate) at the time contained in the scheduled charging information. The vehicle controller 22 may be configured to activate a battery management system (BMS) 24 and an on-board charger (OBC) 26 to perform the charge operation based on the scheduled charging information. When the on-board charger (OBC) 26 is activated, charging equipment 28 connected to the on-board charger (OBC) 26 may also be activated. In particular, the charging equipment 28 may be configured to provide power to the vehicle and may be disposed extraneous to the vehicle, and may always be activated or may be activated via communication with the on-board charger (OBC) 26.

The on-board charger (OBC) 26 may be configured to detect whether the charging equipment 28 is connected to the vehicle. After the on-board charger (OBC) 26 confirms connection of the charging equipment 28, the on-board charger (OBC) 26 may be configured to gather or collect the charging information from the charging equipment 28, and transmit the collected charging information to the vehicle controller 22. In particular, the charging information may include various types of information, for example, a connection state of the charging equipment 28, the type of the charging equipment 28, and accounting information of power source received from the charging equipment 28.

The vehicle controller (VCU) 22 having received the charging information from the on-board charger (OBC) 26 may be configured to charge the in-vehicle battery according to the scheduled charging information established by the user. In particular, when charging is allowed or initiated by the vehicle controller 22, the battery management system (BMS) 24 may be configured to transmit a request message for starting charging to the on-board charger (OBC) 26. Upon receiving the request message, the on-board charger (OBC) 26 may be configured to receive the charging power from the charging equipment 28. The on-board charger (OBC) 26 may be configured to transmit the charging current to the in-vehicle battery (not shown) via the battery management system (BMS) 24.

During the charging process, the battery management system (BMS) 24 may be configured to transmit the battery charging state to both the vehicle controller 22 and the multimedia system 20. The vehicle controller 22 may then be configured to determine the charging termination time based on the charge status data and the scheduled charging information received from the battery management system (BMS) 24.

When the vehicle controller 22 determines to finish charging, the vehicle controller 22 may be configured to transmit the determined information to the battery management system (BMS) 24 and the on-board charger (OBC) 26, and the battery management system (BMS) 24 may be configured to operate the battery management system (BMS) 24 to receive minimal power. The charging equipment 28 having received the charging termination command from the on-board charger (OBC) 26 may be configured to stop providing the on-board charger (OBC) 26 with the charging power or the charging power source.

As described above, when the user connects the AC charging equipment under the condition that the scheduled charging operation is activated, the vehicle controller 22 may be configured to hold (e.g., standby and not charge) battery charging at the charger connection time, and may initiate (e.g., start charging) at a specific time established in the scheduled charging information of the user, and thus, the vehicle controller 22 may be configured to enter the charging standby state to perform the charging process (e.g., until the scheduled charging time). Assuming that the user desires to charge the battery as soon as the battery is connected to the charger under the condition that the user activates the scheduled charging operation, when the user directly pushes or engages the charge start button or deactivates the scheduled charging operation, the vehicle battery may be immediately charged with electricity.

The charging equipment (e.g., Electric Vehicle Supply Equipment, EVSE) is constructed to transfer the electric energy received from the power supply source to charge the battery mounted to each electric vehicle (EV), and it is necessary to guarantee flow of appropriate and safe power or current. The EVSE may be classified into a few charging equipment based on the in-vehicle battery charging speed. For example, the AC charging equipment configured to supply AC power or AC electricity may provide at least one of two AC power sources comprised of a first level (Level 1) configured to use a 120V AC power plug and a second level (Level 2) configured to use a 240V or 208V AC power plug. In contrast, the AC charging equipment configured to supply DC power or DC electricity may charge the in-vehicle battery at a higher speed than the AC charging equipment. For example, the DC charging equipment may be configured to receive 480V AC power, convert the 480V AC power into DC power, and provide the resultant DC power to the vehicle.

The above-mentioned charging equipment (i.e., EVSE) may be used for public use or for household/private use. Typically, the charging equipment may be classified into stationary charging equipment permanently connected to a power supply unit and portable charging equipment including an in-cable-control box (ICCB). For example, the stationary charging equipment may include a charging station or tower-shaped charging equipment installed in public or private parking lots. In contrast, the portable charging equipment may connect the ICCB to the power-supply unit (e.g., 110V or 220V electrical outlet), to charge the vehicle.

Typically, although the AC charging equipment are stationary devices, the AC charging equipment may be classified into the stationary AC charging equipment or the portable AC charging equipment. The scheduled charging operation established by the user may operate irrespective of the categories of the AC charging equipment. However, since the AC charging equipment (low-speed charger) installed in public places requires a substantial period of time to charge the vehicle, it is undesirable that a specific user monopolistically uses the charging equipment for such a substantial period of time. Therefore, the operation for utilizing the scheduled charging operation in the public-use AC charging equipment inefficient. As a result, the vehicle driver or user who alternately uses the public charging equipment and the household/private charging equipment must repeatedly perform activation or deactivation of the scheduled charging operation established in the vehicle.

Figure 2:
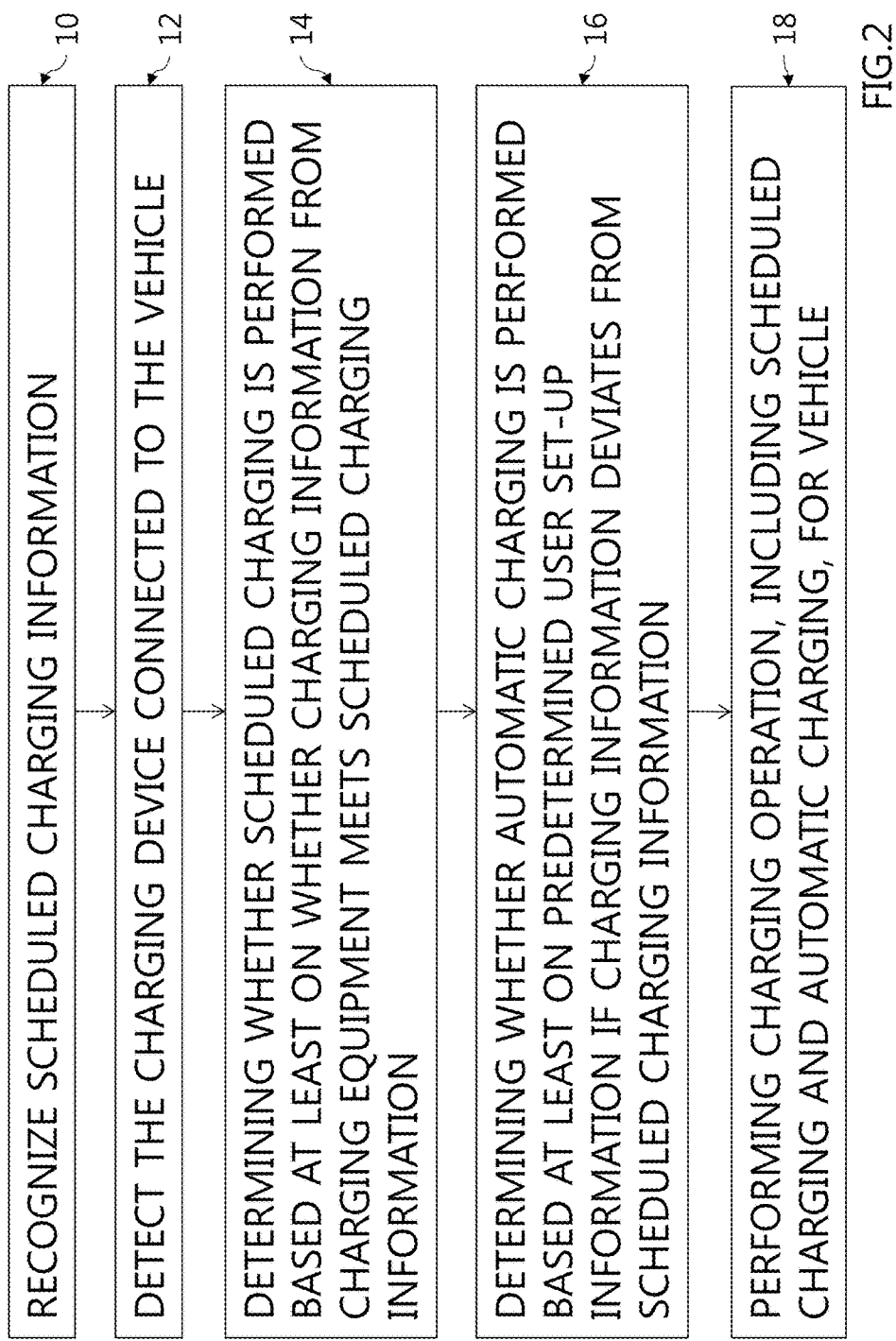
FIG. 2 is a flowchart illustrating a vehicle charging control method according to an exemplary embodiment of the present disclosure.

FIG. 2 is a flowchart illustrating a vehicle charging control method according to an exemplary embodiment of the present disclosure. The method described herein below may be executed by the vehicle controller. Referring to FIG. 2, the vehicle charging control method may include recognizing predetermined scheduled charging information for battery charging in step 10; detecting the charging equipment connected to the vehicle in step 12; determining execution or non-execution of the scheduled charging operation based on whether the charging information associated with the charging equipment corresponds to the scheduled charging information in step 14; when the charging information deviates from the scheduled charging information, determining execution or non-execution of automatic charging according to predetermined user set-up information in step 16; and performing the above charging based on execution or non-execution of the scheduled charging operation or execution or non-execution of such automatic charging.

When the vehicle driver or user does not charge the vehicle battery according to execution or non-execution of the scheduled charging operation, and when the charging equipment is connected to the vehicle during a time zone irrelevant to the scheduled charging information, the vehicle may be automatically charged with electricity based on user set-up information. In particular, the user set-up information may include the type of the charging equipment for battery charging, the operation time of the user, and the accounting information to be consumed for battery charging.

The user set-up information to be established for charging the in-vehicle battery may include the charging time (e.g., the time during which the vehicle is not driven by the user), costs (e.g., costs required for the type of the charging equipment and the charging time) consumed for battery charging, etc. Although the vehicle driver or user does not engage the charging start button after connecting the vehicle to the charging equipment, the charging control device mounted to the vehicle may be configured to determine whether to charge the vehicle battery in response to user set-up information, and may immediately charge the in-vehicle battery based on the determined information.

For example, in association with execution or non-execution of the automatic charging operation, assuming that the charging equipment connected to the vehicle is public-use stationary charging equipment according to the charging information, when the vehicle detects the charging equipment, the charging operation may be immediately performed. When using the public-use stationary charging equipment, it is undesirable for the vehicle driver or user to freely use the corresponding charging equipment. Thus, when connection between the vehicle and the charging equipment is detected without reception of an additional user input signal, the charging process may be immediately performed.

In addition, in association with execution or non-execution of the automatic charging operation, assuming that the charging equipment connected to the vehicle is a public-use portable charging equipment according to the charging information, when the vehicle detects the charging equipment, the charging operation may be immediately performed, or the charging operation may be performed based on the scheduled charging operation contained in the user set-up information.

For example, when the power-supply unit (e.g., 110V or 220V electrical outlet) installed in the apartment building or the like to support low-speed vehicle charging is connected to the vehicle via the portable charging equipment including the ICCB (In-Cable-Control Box), the charging equipment may be used as the public-use charging equipment, and thus, the immediate charging process may be performed. When necessary, the scheduled charging operation may be used during a time zone (e.g., midnight) desired by a relatively smaller number of users.

In association with execution or non-execution of the automatic charging operation, assuming that the charging equipment connected to the vehicle is private-use charging equipment according to the charging information, when the vehicle detects the charging equipment, the charging operation may be deferred until the charging information corresponds to the set-up information. When the user engages the button for starting charging after the charging equipment is connected to the vehicle, the vehicle may be immediately charged with electricity, irrespective of whether the vehicle charging control device determines execution or non-execution of the automatic charging operation.

Although not shown in the drawings, the vehicle charging control method may further include transmitting status information of the charging process according to execution or non-execution of the scheduled charging or the automatic charging to a user-desired terminal. After the vehicle driver or user connects the vehicle to the charging equipment, the vehicle driver or user may be located remote from the vehicle and the charging equipment. Accordingly, the vehicle charging control device may be configured to transmit status information of the charging process state, the charging result, the estimated time to be consumed for such charging, estimated costs required for such charging, or the charging account information to a wireless terminal carried by the vehicle driver or user (e.g., a portable device of the user).

As described above, the present disclosure may automatically distinguish between the portable AC charging equipment used as the private-use AC charger and the stationary AC charging equipment used as the public-use AC charger using the in-vehicle charging control device. Thereafter, assuming that the public-use stationary AC charging equipment is connected to the vehicle without receiving an additional input signal from the user, the charging control device may be configured to enter a standby mode and start battery charging from a specific time at which connection of the charger is achieved by the user without consumption of the standby state/time, resulting in greater user convenience.

Figure 3:
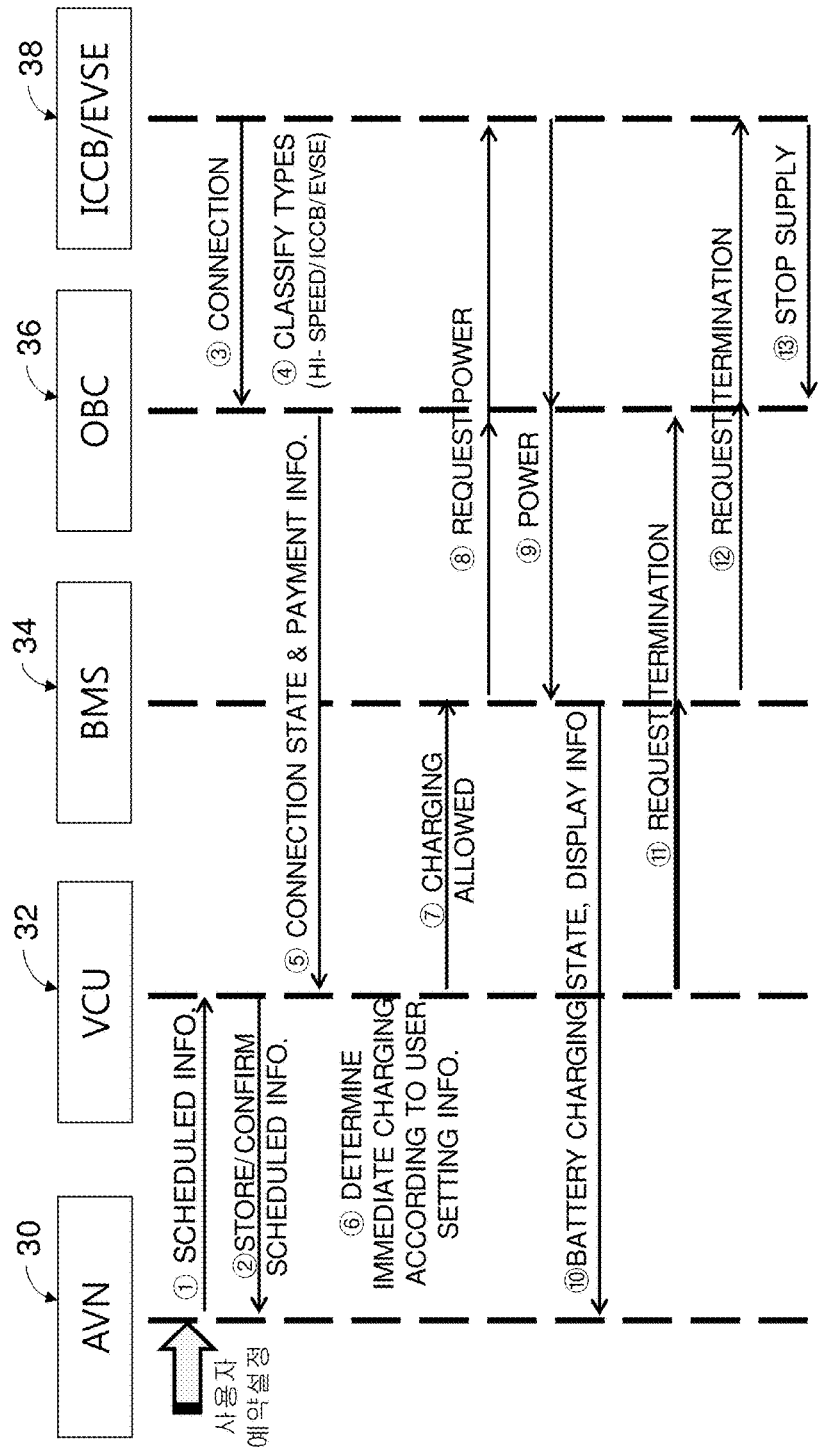
FIG. 3 is a flowchart illustrating an example of the vehicle charging control method of FIG. 2 according to an exemplary embodiment of the present disclosure.

FIG. 3 is a flowchart illustrating an example of the vehicle charging control method of FIG. 2. Referring to FIG. 3, the scheduled charging operation may be input by the user through the user interface (UI) of the in-vehicle multimedia system (e.g., Audio Video Navigation (AVN) device). A multimedia system 30 may be configured to store user-desired scheduled charging information therein, and transmit the scheduled charging information to a vehicle control unit (VCU) 32. The vehicle control unit 32 may be configured to detect whether the scheduled charging information is stored in the multimedia system 30.

An on-board charger (OBC) 36 may be configured to detect whether charging equipment 38 is connected to the vehicle. After the on-board charger (OBC) 36 confirms connection of the charging equipment 38, the on-board charger (OBC) 36 may be configured to gather or collect the charging information from the charging equipment 38, such that the on-board charger (OBC) 36 may recognize the type of the charging equipment 38. For example, the on-board charger (OBC) 36 may be configured to determine whether the charging equipment 38 is any one of the DC charging equipment for high-speed charging, the stationary charging equipment for low-speed charging, and the portable charging equipment for low-speed charging.

When the type of the charging equipment 38 is recognized, the on-board charger (OBC) 36 may be configured to transmit the charging information collected from the charging equipment 38 to the vehicle control unit 32. In particular, the charging information may include various types of information, for example, a connection state of the charging equipment 38, the type of the charging equipment 38, and accounting information of power source received from the charging equipment 38.

The vehicle control unit 32 having received the charging information from the on-board charger (OBC) 36 may be configured to initiate charging of the in-vehicle battery according to the scheduled charging information established by the user. In particular, under operation of the vehicle control unit 32, the battery manager 34 may be configured to transmit a request message for starting charging to the on-board charger (OBC) 36. Upon receiving the request message, the on-board charger (OBC) 36 may be configured to receive the charging power from the charging equipment 38. The on-board charger (OBC) 36 may be configured to transmit the charging current to the in-vehicle battery (not shown) through the battery manager 34.

During the charging process, the battery manager 34 may be configured to transmit the battery charging state to the vehicle control unit 32 and the multimedia system 30. The vehicle control unit 32 may be configured to determine the charging termination time based on the charge status data and the scheduled charging information received from the battery manager 34. When the vehicle control unit (VCU) 32 determines to finish charging, the vehicle control unit 32 may be configured to transmit the determined information to the battery manager 34 and the on-board charger (OBC) 36, and the battery manager 34 may be configured to prevent the battery manager 34 from receiving further power signals. The charging equipment 36 having received the charging termination command from the on-board charger (OBC) 36 may be configured to stop providing the on-board charger (OBC) 36 with the charging power or the charging power source.

Figure 4:
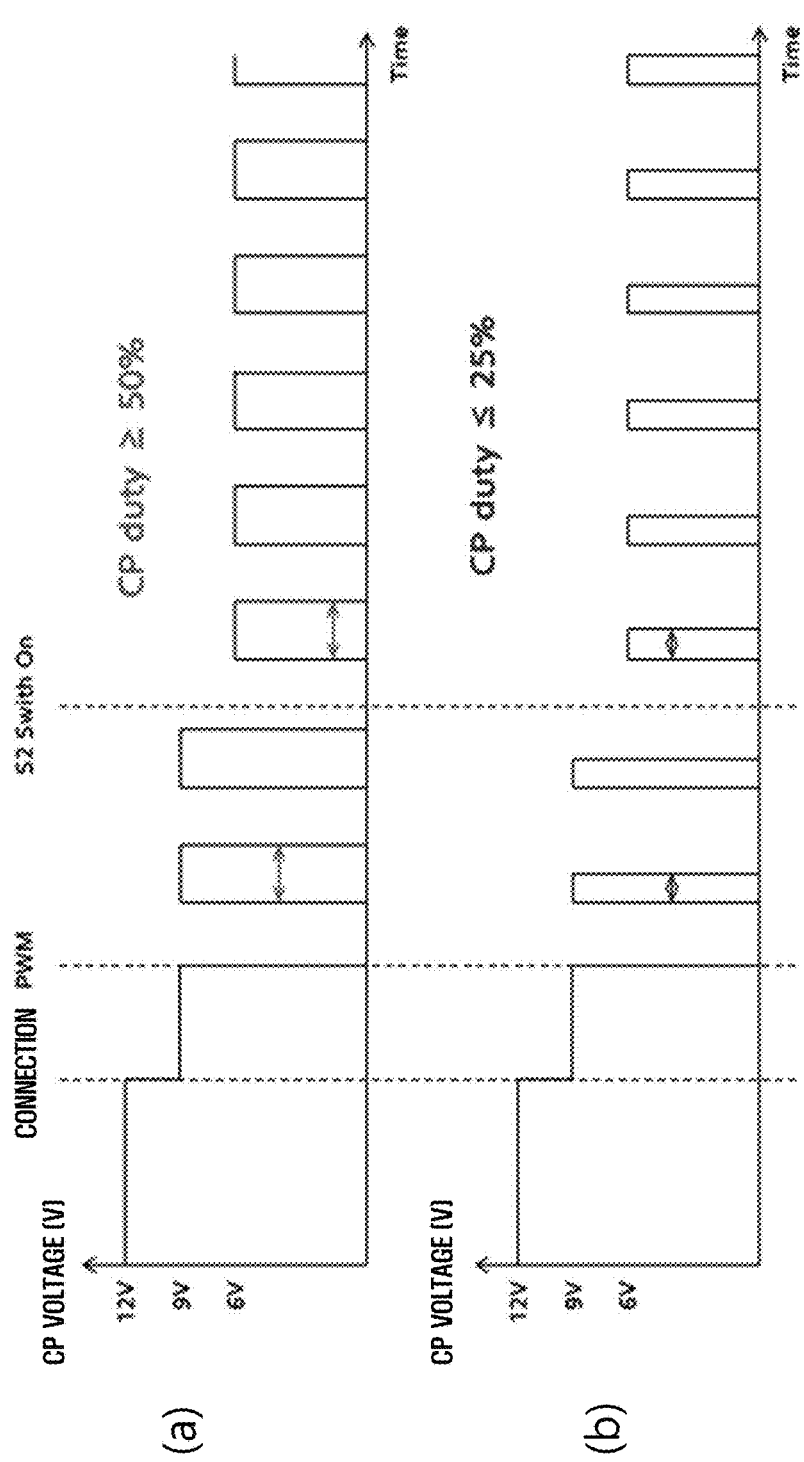
FIG. 4 is a conceptual diagram illustrating characteristics of the plurality of AC charging equipment according to an exemplary embodiment of the present disclosure.

FIG. 4 is a conceptual diagram illustrating characteristics of the plurality of AC charging equipment. In particular, portion (a) of FIG. 4 illustrates a control pilot (CP) signal of the stationary charging equipment, and portion (b) of FIG. 4 illustrates the control pilot (CP) signal of the stationary charging equipment including the ICCB. In particular, the CP signal may be transmitted using the pulse width modulation (PWM) scheme.

As illustrated in FIG. 4, the AC charging equipment for providing the AC power has different CP signal duty ratios (i.e., different CP signal duty cycles) based on whether the AC charging equipment is a stationary device or a portable device. For example, assuming that the CP signal duty ratio (or the CP signal duty cycle) contained in the charging information is equal to or greater than about 50%, the in-vehicle charger (i.e., OBC) may be configured to detect the corresponding charging equipment as the stationary charging equipment. In addition, assuming that the CP signal duty ratio (or the CP signal duty cycle) contained in the charging information is equal to or less than about 25%, the OBC may be configured to detect the corresponding charging equipment as the portable charging equipment including the ICCB.

In accordance with the exemplary embodiment, assuming that the CP signal duty ratio is equal to or greater than about 23%, the corresponding charging equipment may be determined to be the stationary charging equipment (e.g., EVSE). Assuming that the CP signal duty ratio is less than about 23%, the corresponding charging equipment may be determined to be the ICCB.

Figure 5:
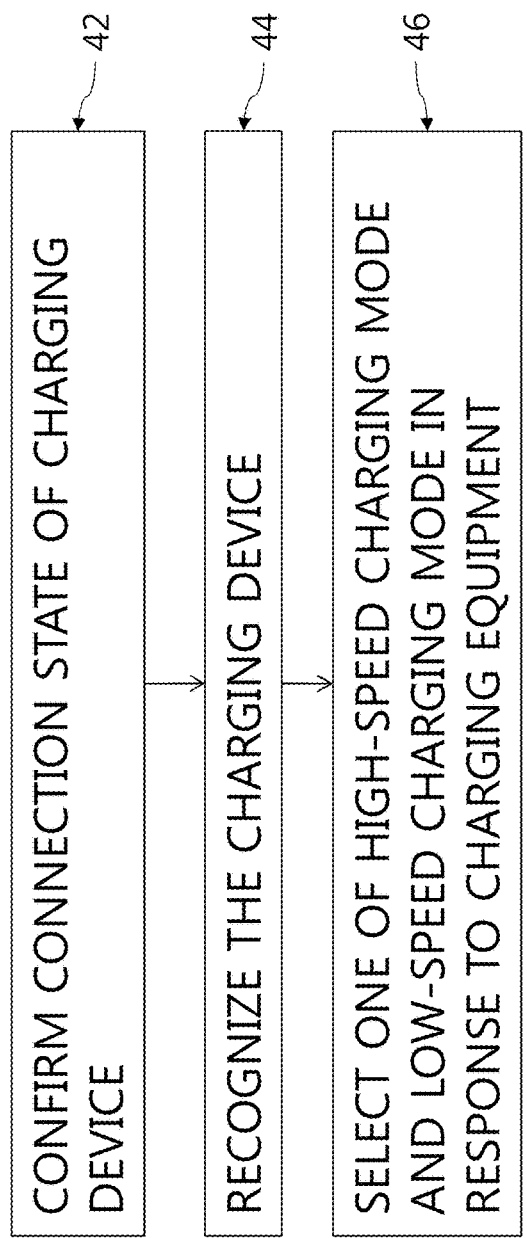
FIG. 5 is a flowchart illustrating a method for detecting the charging equipment connected to the vehicle according to an exemplary embodiment of the present disclosure.

FIG. 5 is a flowchart illustrating a method for detecting the charging equipment connected to the vehicle. Referring to FIG. 5, the method for detecting the charging equipment connected to the vehicle may include recognizing a connection state of the charging equipment in step 42; recognizing the type of the charging equipment in step 44; and selecting any one of the high-speed charging mode and the low-speed charging mode based on the charging equipment type. The method for recognizing the charging equipment type may be performed based on the CP signal duty ratio of FIG. 4.

Meanwhile, assuming that the in-vehicle charging control device detect the charging equipment type and the charging equipment is detected as the high-speed charging equipment (e.g., the charging equipment for providing DC power), the vehicle charging control device may be configured to determine the high-speed charging mode, and may immediately perform charging, irrespective of the scheduled charging information established by the user, execution or non-execution of the scheduled charging based on user set-up information, and execution or non-execution of the automatic charging.

Figure 6:
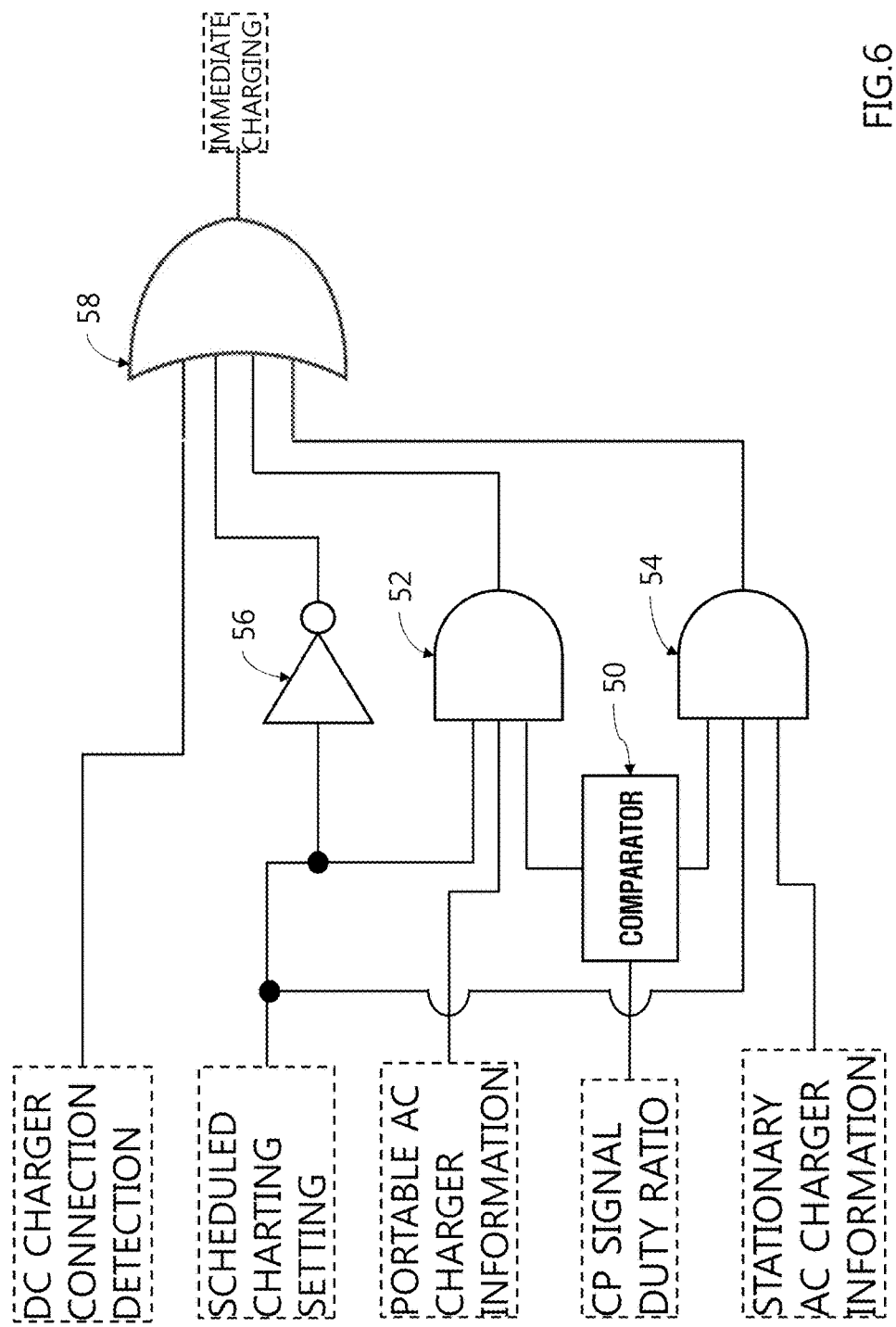
FIG. 6 is a conceptual diagram illustrating a method for determining execution or non-execution of immediate charging after connection of the charging equipment according to an exemplary embodiment of the present disclosure.

FIG. 6 is a conceptual diagram illustrating a method for determining execution or non-execution of immediate charging after connection of the charging equipment. Referring to FIG. 6, the vehicle charging control device may be configured to determine whether the automatic charging is performed according to user set-up information. For example, a circuit for determining execution or non-execution of the automatic charging may be designed by a simple logic circuit. This circuit for determining execution or non-execution of the automatic charging may include an inverter 56, logic AND gates (52, 54), a logic OR gate 58, and a comparator 50.

In response to determining that the charging equipment for providing DC power is connected to the vehicle, the apparatus for determining execution or non-execution of the automatic charging may be configured to determine the necessity of immediate charging using the logic OR gate 58. In addition, when the scheduled charging information is established, the apparatus for determining execution or non-execution of the automatic charging may be configured to defer immediate charging through the logic OR gate 59 and the inverter 56.

The apparatus for determining execution or non-execution of the automatic charging may be configured to compare the CP signal duty ratio with a predetermined value (e.g., about 25% or 50%) established in the comparator 50, and transmit the result indicating whether the charging equipment connected to the vehicle is the stationary AC charger or the mobile AC charger to different logic AND gates 58. In addition, the logic AND gate 52 that corresponds to the portable AC charger may be configured to receive information indicating whether the user establishes the scheduled charging information, receive information indicating whether the user set-up information for the portable AC charger is established, and receive information indicating whether the charging equipment connected to the vehicle is the portable AC charger using the comparator 50, to thus determine execution or non-execution of immediate charging based on the user set-up information related to the portable AC charger.

In addition, the logic AND gate 54 corresponding to the stationary AC charger may be configured to receive information indicating whether the scheduled charging information is established by the user, receive information indicating whether user set-up information for the stationary AC charger is established, and receive information indicating whether the charging equipment connected to the vehicle is the stationary AC charger using the comparator 50, to determine execution or non-execution of immediate charging based on the user set-up information related to the stationary AC charger.

Although the apparatus for determining execution or non-execution of the automatic charging includes a few logic gates, the scope or spirit of the present disclosure is not limited thereto. In addition, the apparatus for determining execution or non-execution of the automatic charging may be comprised of one or more modules.

Figure 7:
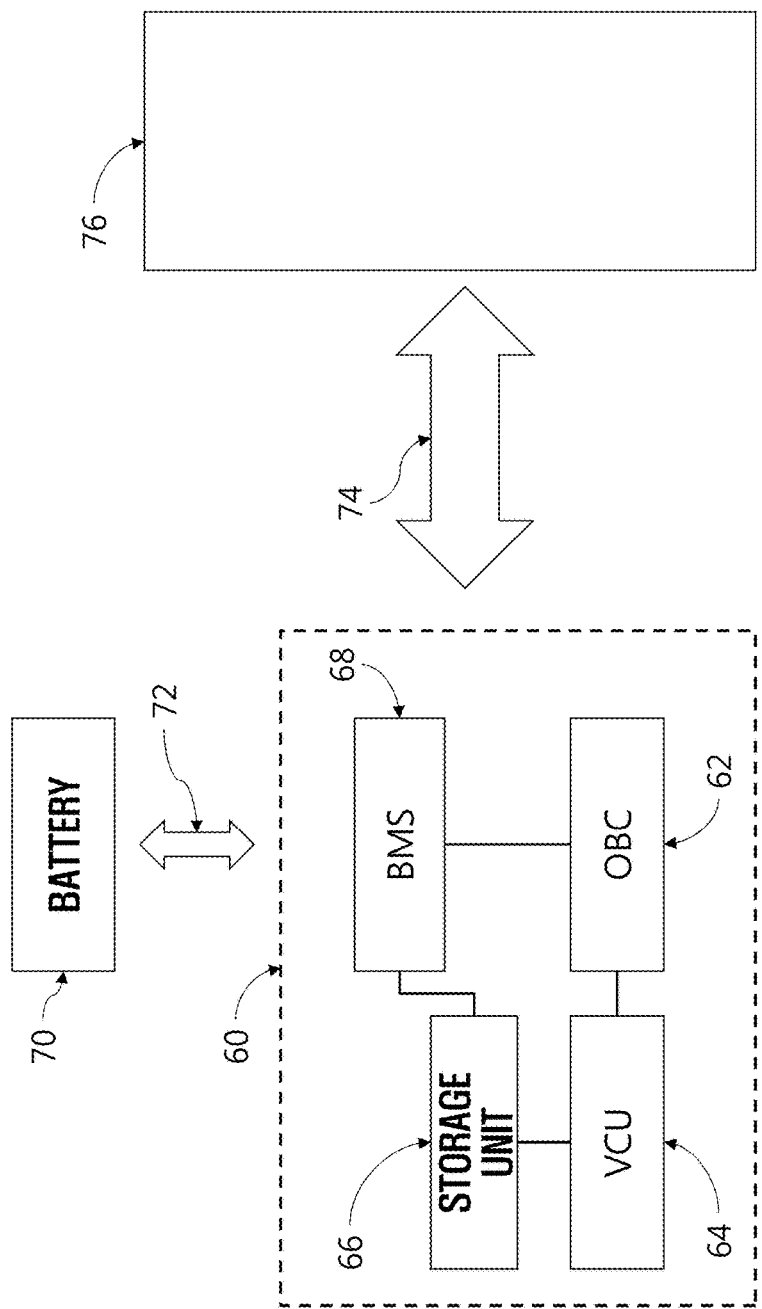
FIG. 7 is a block diagram illustrating a vehicle charging control device according to another exemplary embodiment of the present disclosure.

FIG. 7 is a block diagram illustrating a vehicle charging control device according to another exemplary embodiment of the present disclosure. Referring to FIG. 7, the vehicle charging control device 60 may be connected to the charging equipment 76 configured to provide power (e.g., power-supply voltage) 74 for charging the in-vehicle battery 70. The vehicle charging control device 60 may include a storage unit 66 configured to store the predetermined scheduled charging information and the user set-up information; a charger 62 configured to receive power from the charging equipment 76; a vehicle control unit (VCU) 64 configured to determine execution or non-execution of the scheduled charging based on whether the charging equipment related charging information received from the charger 62 corresponds to the scheduled charging information, and determine execution or non-execution of the automatic charging based on the user set-up information when the charging information deviates from the scheduled charging information; and a battery manager 68 configured to detect a state of the battery 70 based on information indicating execution or non-execution of the scheduled charging and also information indicating execution or non-execution of the automatic charging, and request the charger 62 to perform execution of the charging operation.

The charger 62 may be configured to detect a connection state of the charging equipment 76. When the charging equipment 76 is detected, the vehicle control unit 64 may be configured to select any one of the high-speed charging mode and the slow-speed charging mode based on the type of the charging equipment 76. For example, when the current mode is the high-speed charging mode, the vehicle control unit 64 may be configured to output a charging command for the charging operation, irrespective of execution or non-execution of the scheduled charging and execution or non-execution of the automatic charging.

In particular, the user set-up information may include the type of the charging equipment 76 for battery charging, the operation time of the user, and the accounting information to be consumed for battery charging. For example, in association with execution or non-execution of the automatic charging operation, assuming that the charging equipment 76 is public-use stationary charging equipment based on the charging information, when the vehicle charging control device 69 detects the charging equipment 76, the charging operation may be immediately performed.

In association with execution or non-execution of the automatic charging operation, assuming that the charging equipment 76 is public-use portable charging equipment based on the charging information, when the vehicle charging control device 60 detects the charging equipment 76, the charging operation may be immediately performed, or the charging operation may be performed based on the scheduled charging operation contained in the user set-up information.

In association with execution or non-execution of the automatic charging operation, assuming that the charging equipment 76 connected to the vehicle is private-use charging equipment according to the charging information, when the vehicle charging control device 60 detects the charging equipment 76, the charging operation may be deferred until the charging information corresponds to the set-up information. In association with execution or non-execution of the automatic charging operation, the vehicle charging control device 60 may be configured to perform immediate charging in response to user input.

For example, assuming that the charging equipment 76 connected to the vehicle charging control device 60 is the AC charging equipment for providing the AC power (or AC electricity), the charger 62 may be configured to receive at least one of two AC power sources comprised of a first level (Level 1) configured to use the 120V AC power plug and a second level (Level 2) configured to use the 240V or 208V AC power plug.

The charging information capable of being collected by the charger 62 may include the CP signal duty ratio (or duty cycle) indicating whether the charging equipment 76 is the stationary charger or the portable charger including the In-Cable-Control Box (ICCB). The charger 62 may be configured to detect the type of the charging equipment 62 based on the CP signal duty ratio.

Although not shown in the drawings, the vehicle charging control device 60 may further include a communicator (not shown) configured to transmit status information of the charging process based on execution or non-execution of the scheduled charging or the automatic charging to a user-desired terminal. In addition, the scheduled charging information and the user set-up information may be received via at least one of the in-vehicle multimedia system (e.g., AVN device) and the telematics server (or the wireless terminal) connected a the network.

FIGS. 8A-8B are diagrams illustrating a vehicle charging control method capable of being selected by the user. In particular, FIG. 8A is a conceptual diagram illustrating the vehicle charging control method for use when the interface capable of being selected by the vehicle driver or the user is provided. FIG. 8B is a conceptual diagram illustrating the vehicle charging control method for use when the interface capable of being selected by the vehicle driver or the user is not provided.

Referring to FIG. 8A, assuming that the scheduled charging information is not established, when the vehicle charging control device detects the charging equipment, immediate charging may be performed. In addition, when the scheduled charging information is established, the portable/household charging equipment may be detected. Assuming that user selection does not occur (e.g., a user input is not received), when the vehicle charging control device detects the charging equipment, immediate charging may be performed. In addition, when the user selection occurs, although the vehicle charging control device detects the portable/household charging equipment, the scheduled charging operation may be performed based on the predetermined scheduled charging information.

In addition, assuming that the public-use stationary charging equipment is detected and the user selection does not occur, when the vehicle charging control device detects the charging equipment, immediate charging (e.g., without entering a standby mode based on a selected charging schedule) may be performed. Further, assuming that user selection occurs, although the vehicle charging control device detects the public-use stationary charging equipment, the scheduled charging operation may be performed based on the predetermined scheduled charging information.

Referring to FIG. 8B, assuming that the portable/household charging equipment is detected on the condition that the user interface (UI) is not provided, the vehicle charging control device may be configured to perform the scheduled charging operation based on the predetermined scheduled charging information. In addition, when the public-use stationary charging equipment is detected, the vehicle charging control device may be configured to perform immediate charging.

Figure 9:
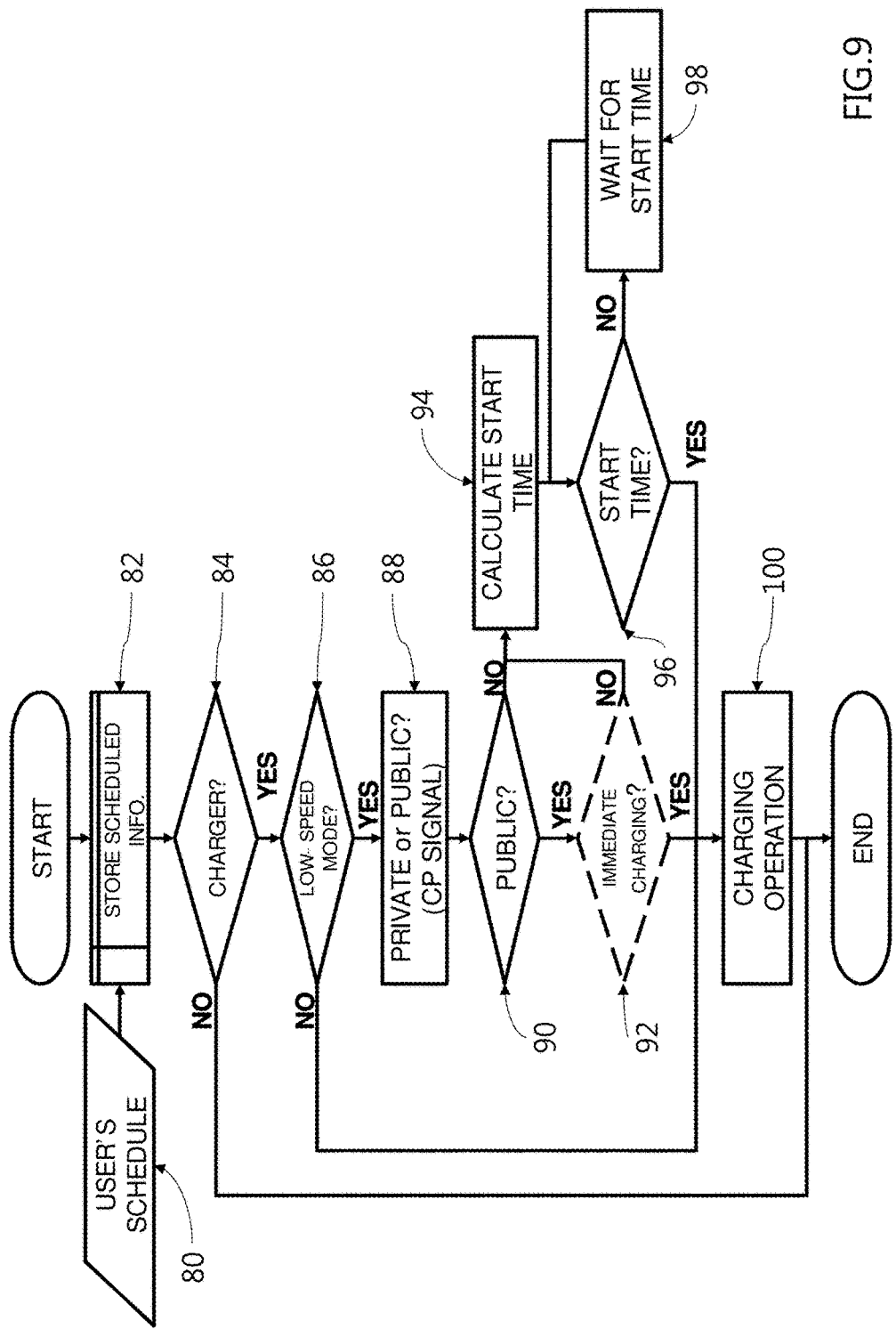
FIG. 9 is a flowchart illustrating a vehicle charging control method according to user input information or user set-up information according to an exemplary embodiment of the present disclosure.

FIG. 9 is a flowchart illustrating a vehicle charging control method according to user input information or user set-up information. Referring to FIG. 9, when the user inputs the scheduled charging information through an interface in step 80, the vehicle charging control method may be configured to store the established scheduled charging information in step 82. Thereafter, connection or non-connection of the charging equipment may be determined in step 84. Whether the charging mode is the low-speed charging mode or the high-speed charging mode may be determined based on whether the connected charging equipment provides AC power or DC power in step 86. When the low-speed charging mode is detected, the controller may be configured to determine whether the charging equipment is the portable (household) charging equipment or the stationary charging equipment based on the CP signal in step 88.

Assuming that the stationary (public-use) charging equipment is detected, when the user interface (UI) is provided, execution or non-execution of the immediate charging may be determined based on the user input in step 92. When immediate charging is required, the charging operation may be performed in step 100. Assuming that the user interface (UI) is not provided, when the stationary (public-use) charging equipment is detected, immediate charting may be performed in step 100.

Meanwhile, when the portable (household) charging equipment is detected, the portable charging equipment may be configured to calculate and store the charging start time (e.g., according to the scheduled charging information) in step 94. When the current time reaches the charging start time in step 96, the charging operation may be performed in step 100. When the charging start time is not reached in step 96, the standby state may be maintained until the current time reaches the charging start time in step 98. In other words, the charging may only be performed when the charging start time is reached.

When connection of the low-speed charging equipment is detected, the charger (i.e., on board charger: OBC) may be configured to distinguish between the household (private-use) or the public-use charging equipment based on the CP signal duty ratio received from the charging equipment, and provide the user interface (UI) for allowing the user to establish execution or non-execution of the scheduled characteristic function during the low-speed charging mode. Alternatively, the scheduled charging operation established by the conventional low-speed charger may automatically release when the public-use low-speed charger is connected, and immediate charging may then be performed.

Figure 10:
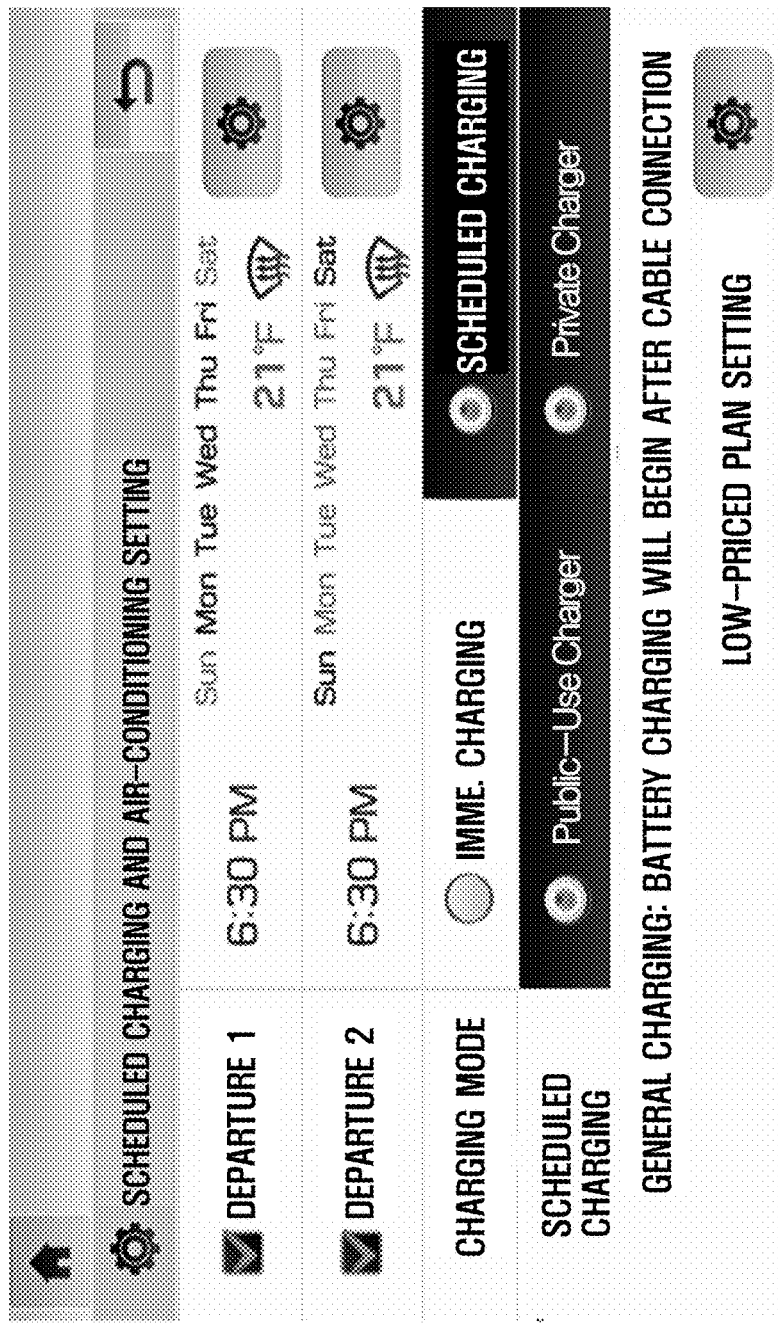
FIG. 10 is a view illustrating an example of a user interface (UI) of the vehicle charging control device according to an exemplary embodiment of the present disclosure.

FIG. 10 is a view illustrating an example of a user interface (UI) of the vehicle charging control device. Referring to FIG. 10, the user may input the scheduled charging information or the user set-up information (e.g., indicating whether the scheduled charging information is used) in the vehicle charging control device via the in-vehicle multimedia device, the touchscreen, or the like. For example, the user may input the scheduled charging operation, and may establish whether the charging equipment related to the scheduled charging information is the public-use stationary charging equipment or the private-use (household) portable charging equipment. As shown in FIG. 10, the user may select applying the scheduled charging information to both the public-use stationary charging equipment and the private-use portable charging equipment.

Meanwhile, the above-mentioned vehicle charging control apparatus and method may also be applied to the charging control process using the AC or DC charging equipment for providing the charging power through the cable, and also using the wireless charging equipment for providing power via the wireless power communication scheme.

As is apparent from the above description, the effects of the apparatus according to the exemplary embodiment of the present disclosure are as follows. The method and apparatus for charging the electric vehicle using the AC charger according to the present disclosure may automatically charge the OBC based on a predetermined reference without additional manipulation after the user connects the AC charger to the vehicle, resulting in increased user convenience.

Even charging of the vehicle is not possible based on the scheduled charging operation established by the user, the method and apparatus for charging the electric vehicle according to the present disclosure may be configured to automatically detect the AC charger to charge the OBC, resulting in implementation of more efficient charging. In addition, the method and apparatus for charging the electric vehicle according to the present disclosure may be configured to automatically charge the vehicle based on user setting information, and thus, costs and time required to charge the in-vehicle battery (OBC) are reduced, resulting in increased user convenience.

The method according to the exemplary embodiments may be embodied as a program that can be executed by a computer and may be stored in non-transitory recording media readable by the computer. Examples of the recording media readable by the computer may include a read only memory (ROM), a random access memory (RAM), a compact disc read only memory (CD-ROM), a magnetic tape, a floppy disk, and an optical data storage device. In addition, the non-transitory recording media readable by the computer may also be realized in the form of a carrier wave (for example, transmission over the Internet).

The non-transitory recording media readable by the computer may be distributed to computer systems connected to each other via a network such that a code readable by the computer is stored or executed in a distributed manner. In addition, a functional program, code, and code segments for embodying the above method may be easily reasoned by programmers in the art to which the disclosure pertains.

It will be apparent to those skilled in the art that various modifications and variations can be made in the present disclosure without departing from the spirit or scope of the disclosure. Therefore, the above-mentioned detailed description must be considered only for illustrative purposes instead of restrictive purposes. The scope of the present disclosure must be decided by a rational analysis of the claims, and all modifications within equivalent ranges of the present disclosure are within the scope of the present disclosure.

What is claimed is:

1. A vehicle charging control method, comprising:
recognizing scheduled charging information predetermined for vehicle charging;
detecting charging equipment connected to the vehicle;
determining whether a scheduled charging is performed based on whether charging information received from the charging equipment corresponds to the scheduled charging information;
determining whether an automatic charging is performed based on predetermined user set-up information when the charging information deviates from the scheduled charging information; and
performing a charging operation, including the scheduled charging and the automatic charging, for the vehicle, wherein
the charging information received from the charging equipment includes a control pilot (CP) signal duty ratio,
when the CP signal duty ratio is greater than or equal to a reference value, the charging operation is performed in a high-speed charging mode, and
when the CP signal duty ratio is less than the reference value, the charging operation is performed in a low-speed charging mode.

2. The vehicle charging control method according to claim 1, wherein the user set-up information includes a type of the charging equipment for charging, an operation time of the user, and accounting information to be consumed for the charging.

3. The vehicle charging control method according to claim 1, wherein the automatic charging is executed when the charging equipment is considered public-use stationary charging equipment based at least on the charging information.

4. The vehicle charging control method according to claim 1, wherein at least one of the automatic charging and the scheduled charging is performed when the charging equipment is considered public-use portable charging equipment based at least on the charging information.

5. The vehicle charging control method according to claim 1, wherein when the charging equipment is private-use charging equipment based at least on the charging information, the charging operation is deferred until the charging information corresponds to the set-up information.

6. The vehicle charging control method according to claim 1, wherein the charging operation is immediately performed in response to a user input signal.

7. The vehicle charging control method according to claim 1, wherein:
the charging equipment is an alternating current (AC) charging equipment configured to provide AC power or AC electricity, and supports at least one of two AC power sources comprised of a first level based on e a 120V AC power plug and a second level based on a 240V or 208V AC power plug; and
the charging equipment is used as public-use or private-use charging equipment, and corresponds to at least one of a stationary charging equipment permanently connected to a power supply unit and a portable charging equipment including an in-cable-control box (ICCB).

8. The vehicle charging control method according to claim 1, wherein the detecting of the charging equipment connected to the vehicle includes:
recognizing a connection state of the charging equipment;
recognizing the charging equipment; and
selecting any one of the high-speed charging mode and the low-speed charging mode in response to the charging equipment.

9. The vehicle charging control method according to claim 8, further comprising:
performing the charging operation in the high-speed charging mode, irrespective of the scheduled charging or the automatic charging.

10. The vehicle charging control method according to claim 1, wherein the charging information includes a data indicating whether the charging equipment is a stationary charging equipment or a portable charging equipment including an in-cable-control box (ICCB) according to the CP signal duty ratio.

11. The vehicle charging control method according to claim 1, further comprising:
transmitting to a mobile device status data regarding the charging process based on at least one of the scheduled charging operation and the automatic charging operation.

12. A vehicle charging control apparatus, comprising:
a storage unit configured to store predetermined scheduled charging information and user set-up information;
a charger configured to receive supply power from a charging equipment;
a controller configured to determine execution or non-execution of a scheduled charging operation based at least on whether charging equipment related charging information received from the charger corresponds to the scheduled charging information, and when the charging information deviates from the scheduled charging information, and configured to determine execution or non-execution of an automatic charging operation based on the user set-up information; and
a battery manager configured to recognize a battery state based at least on specific information detected by the controller and request the charger to perform execution of the charging, wherein
the specific information indicates execution or non-execution of the scheduled charging operation and execution or non-execution of the automatic charging operation,
the charging information received from the charger includes a control pilot (CP) signal duty ratio,
the controller is further configured to control the charging to be performed in a high-speed charging mode when the CP signal duty ratio is greater than or equal to a reference value, and
the controller is further configured to control the charging to be performed in a low-speed charging mode when the CP signal duty ratio is less than the reference value.

13. The vehicle charging control apparatus according to claim 12, wherein the user set-up information includes a type of the charging equipment for charging, an operation time of the user, and accounting information to be consumed for the charging.

14. The vehicle charging control apparatus according to claim 12, wherein in association with execution or non-execution of the automatic charging operation:
when the charging equipment is public-use stationary charging equipment based on the charging information, and when the vehicle detects the charging equipment, the charging is immediately performed;
when the charging equipment is public-use portable charging equipment based on the charging information, and when the vehicle detects the charging equipment, the charging is immediately performed, or the charging is performed based on the scheduled charging operation contained in the user set-up information;
when the charging equipment is private-use charging equipment based on the charging information, and when the vehicle detects the charging equipment, the charging operation is deferred until the charging information corresponds to the set-up information.

15. The vehicle charging control apparatus according to claim 14, wherein in association with execution or non-execution of the automatic charging operation, the charging is immediately performed in response to a user input signal.

16. The vehicle charging control apparatus according to claim 14, wherein when the charging equipment is an alternating current (AC) charging equipment for providing AC power or AC electricity, the charger is configured to receive at least one of two AC power sources comprised of a first level based on a 120V AC power plug and a second level based on a 240V or 208V AC power plug.

17. The vehicle charging control apparatus according to claim 14, wherein:
when the charger confirms a connection state of the charging equipment and recognizes the charging equipment, the controller is configured to select any one of the high-speed charging mode and the low-speed charging mode in response to the charging equipment, and
the controller configured to perform the charging in the high-speed charging mode, irrespective of execution or non-execution of the scheduled charging or execution or non-execution of the automatic charging.

18. The vehicle charging control apparatus according to claim 14, wherein:
the charging information includes the CP signal duty ratio indicating whether the charging equipment is a stationary charging equipment or a portable charging equipment including an in-cable-control box (ICCB), and
the charger is configured to recognize a type of the charging equipment based at least on the CP signal duty ratio.

19. The vehicle charging control apparatus according to claim 14, further comprising:
a communicator configured to transmit status data of the charging process to a user-desired terminal based at least on execution or non-execution of the scheduled charging operation or execution or non-execution of the automatic charging operation.

20. The vehicle charging control apparatus according to claim 14, wherein the scheduled charging information and the user set-up information are received via at least one of an in-vehicle multimedia system and a telematics server or wireless terminal connected over a network.

\* \* \* \* \*